Oct. 19, 1965 R. W. McKIRDY ETAL 3,212,498
OXYGENATION-DIALYSIS METHOD
Filed July 11, 1962 4 Sheets-Sheet 1

INVENTORS
ROBERT W. McKIRDY
MICHAEL N. LATORRA
BY
James P. Malow

INVENTORS
ROBERT W. M KIRDY
MICHAEL N. LATORRA

INVENTORS
ROBERT W. McKIRDY
MICHAEL N. LATORRA
BY
James P. Malone 3,212,498
OXYGENATION-DIALYSIS METHOD
Robert W. McKirdy, Scarsdale, and Michael N. La Torra, North Babylon, N.Y., assignors to Dilectrix Corp., Farmingdale, N.Y.
Filed July 11, 1962, Ser. No. 209,119
1 Claim. (Cl. 128—214)

This application is a continuation-in-part of our copending application, S.N. 196,406, filed May 21, 1962, entitled Blood Oxygen Means and Methods and now abandoned.

This invention relates to the art of adjusting the chemistry and related functions of blood by means of simultaneous diffusion and dialysis and more particularly to a mechanical lung-kidney arrangement using appropriate membranes for these two distinct processes.

The mechanical arrangement with which this invention is concerned is contrived in such a way that blood is oxygenated by means of gaseous diffusion while at the same time certain constituents of the same blood are removed by dialysis transporting certain electrolytes and low molecular weight entities across the membrane into a dialysis reservoir. The blood is introduced and made to flow between a parallel, array of diffusion and dialysis membranes. In the diffusion region, venal blood which is substantially devoid of oxygen becomes oxygenated by the diffusion of oxygen from the exterior of an appropriate oxygenation channel or trough while at the same time the carbon dioxide, which is biochemically released from the blood, diffuses outward through the membrane into the oxygenation channel. Meanwhile, the other side of the blood film is provided with a dialysing membrane which in turn is adjacent to an appropriate dialysing solution into which are dialysed or transported undesired constituents of the blood. These processes are the basis of so-called extra-corporeal management through the use of artificial organs.

Many varieties of separate diffusion oxygenation systems and separate dialysis systems are being employed with mechanical devices serving to provide compatible venal-arterial circulation for animal and human physiology for support of subsistence as well as for adjusting isolated blood either in its normal physiological state or in any state admixed with appropriate drugs and extenders. The latter refers to modification with various additives for regulating clotting, viscosity, and extension with synthetic plasma ingredients. These mechanical systems do not, for various reasons, replicate in detail all of the complex chemical, biological, or physical actions. Notably deficient in any mechanical, extra-corporeal system is the lack of concurrent dialysis carried out simultaneously with oxygenation especially with directionalized or oriented blood flow as would tend to duplicate in part at least the physiological capillarity through which blood is transported. Little is known, however, concerning the required physiological rejection of waste products, toxic materials, or other deleterious substances ingested by accident, disease or through chronic accumulation, in relation to level of oxidation in the venal blood.

In the present invention, the latter feature has been furnished by the concurrent oxygenation of venal blood as it is being dialysed to normal or accepted physiological condition similar to that of the oxygenated or arterial blood. Of particular value is the provision of simultaneous oxygenation during dialysis that can be related, insofar as the ratio of the oxygen/carbon dioxide tension is concerned, to any specified dialytic clearance of undesirable products resident in the blood stream.

In this invention use is made of a highly efficient diffusion membrane made of ultrathin plastic film derived from biologically and chemically inert polymers and particularly having a high level of hydrophobicity and arranged according to the design described in our aforementioned copending U.S. application. By high hydrophobicity is meant the property of low water reaction or absorption. By ultrathin is meant that level of thickness less than one one thousandth of an inch or 25.4 microns, which to some degree approximates the impedance of many biological tissues, capillaries, and other transport membranes. Of particular use for the quality of chemical inertness are films derived from polyhalogenated olefins and especially polymers derived from polymeric fluorine substituted olefins. One such notable example is polytetrafluoroethylene produced according to the process described in U.S. Patent No. 2,852,811. Other ultrathin hydrophobic films can be employed with substantially equivalent results in certain aspects of oxygenation that include polychlorotrifluoroethylene, polyvinylfluoride, copolymers of tetrafluoroethylene and hexafluoroethylene and other olefins, and copolymers of vinylidenefluoride with hexafluoropropylene. These are generally characterized by absence of any functional, hydrophilic structure or water sensitivity.

For the dialysis, use is made of membranes made from substantially hydrophilic, that is water associate structures such as cellulose and its various regenerated forms, polyvinyl alcohol including its copolymers with olefinic structure such as ethylenevinyl acetate copolymers and their hydrolysis products. These hydrophilic, water sensitive or water complexing films are selected purposely for this invention to assure a water-phase continuum from the blood, through the film, to the external dialysis solutions constituted to remove specific blood components. Of the most common employed for dialysis is the regenerated cellulose form or what is commonly referred to as cellophane, many grades of which are used for commercial and clinical dialysis. The water-sensitive dialysis membrane is placed parallel to the water-insensitive diffusion membrane described above.

It is therefore a principal object of this invention to provide a system for simultaneous oxygenation and dialysis with a parallel array of membrane enclosures for the blood such that while one side of the blood is undergoing dialysis the other side is undergoing diffusional exchange of oxygen for carbon dioxide.

Another object is to provide an oxygenation-dialysis mechanism such that either one of these two processes can be regulated such that the dialysis is restricted to a specified level of oxygenation as would be most desirable for removal of deleterious blood constituents.

A further object of this invention is to provide a dialysis mechanism that can be carried out either exclusively with completely oxygenated blood phase approximating arterial oxygen tension or exclusively with venal blood where the oxygen level, in the blood is depressed by means of either nitrogen or carbon dioxide depending upon the desired level of dialysis.

A still further object is to provide desired ratios of oxygenation to dialysis as is most compatible to any optimum, restorative extra-corporeal adjustment of the blood chemistry.

It has been discovered somewhat surprisingly in the practice of this invention that dialysis of certain electrolytes and drugs often is maximized not at the highest level of oxygenation but at some intermediate level for reasons that are not clear but suspected as being due to some ionic balance that enables a given molecular species to move more expeditiously across the dialyzing membrane with a high kinetic import. Unless a regulatable oxygenation-dialysis system is provided, many of the necessary efficient dialysis mechanisms may lie dormant awaiting clinical accident for their discovery. Hence, this invention provides a useful tool for studying dialysis mechanism, ultimately for not only clinical applications but for preparing storable blood and its derivatives, in relation to well-characterized blood conditions as defined by the ratio of oxygen to carbon dioxide tension. These objects are accomplished by the following drawings and descriptions of the diffusion-dialysis arrangement and the ensuing examples.

Figure 1:
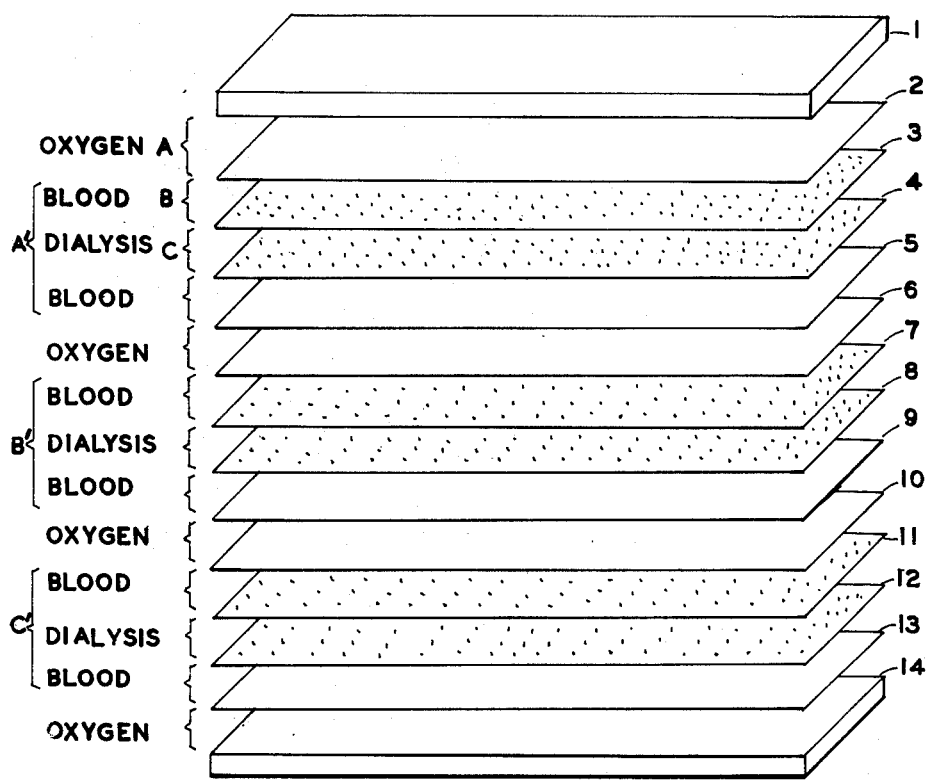
FIG. 1 is a schematic view illustrating an embodiment of the invention.

FIG. 1 provides a schematic view of a typical arrangement comprising a sequential series of taut, prestretched membranes for oxygenation channel A, contained blood layer B filmed to less than an average of 0.020-inch, dialysis layer C, each of these repeated serially as shown. The membranes in FIG. 1 are provided in three such sets labelled A', B' and C' which can be added onto or reduced to two, A' and B', or one A' diffusion-dialysis system depending upon required rates of rectification of the blood.

As in our above mentioned copending application oxygenation-dialyser FIG. 1 is supported by means of end plates 1 and 14 with intervening parallel arrangement of diffusion oxygenation membranes 2, 5, 6, 9, 10 and 13 made of ultrathin hydrophobic polyolefin films including fluorinated polyolefin plastics. In between are positioned the dialysis membranes 3, 4, 7, 8, 11 and 12 made of the hydrophilic film such as regenerated cellulose.

Figure 2:
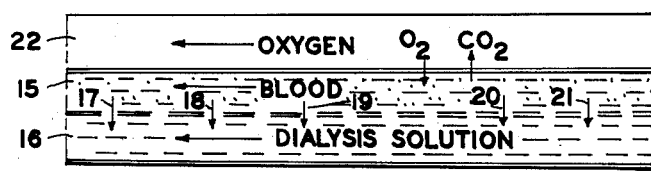
FIG. 2 is an enlarged detail view of the embodiment of FIG. 1.

As indicated in the cross-sectional view in FIG. 2 the blood layer 15 is made to pass in film form in between these two film systems in which the oxygen 22 and dialysis solution 16 is made to flow parallel to the blood flow, or alternatively in any of the several possible counter-current flow variations. Into the dialysis layer the undesired waste or harmful toxins and such inordinately high levels of urea 17, glucose 18, barbiturates 19, and any other ingested chemicals 20, 21, etc. are made to pass into the flowing dialysis stream 16.

Figure 3:
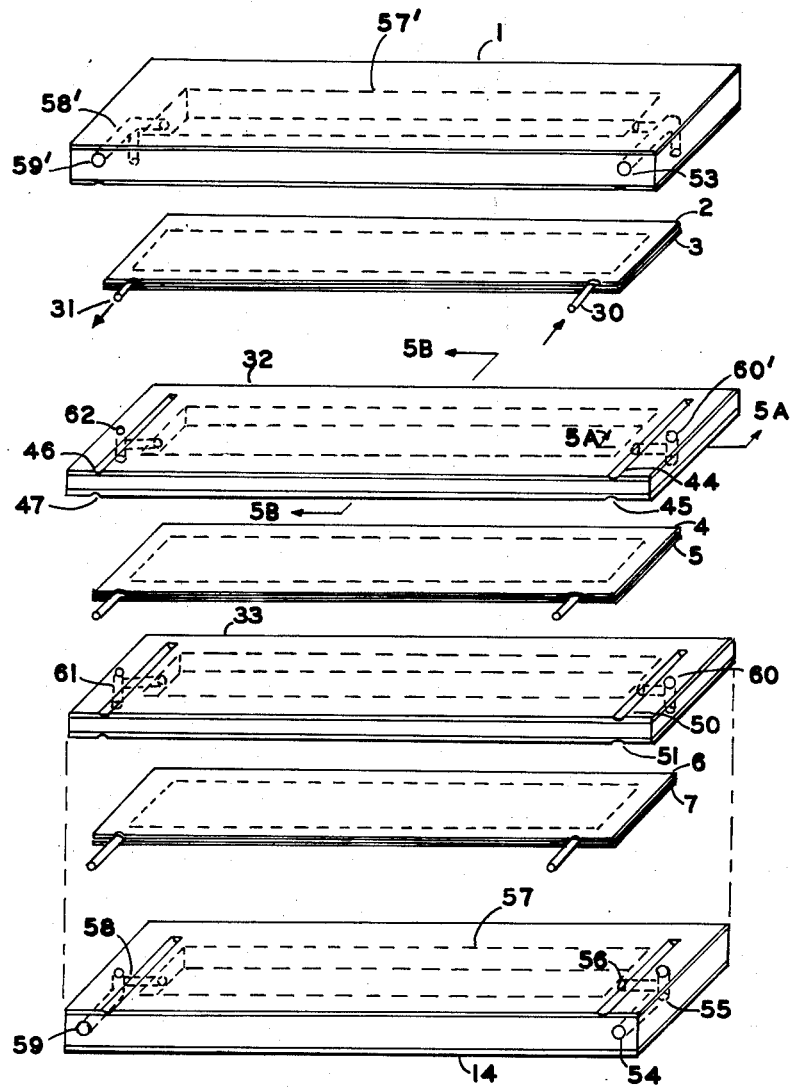
FIG. 3 is an exploded view of an embodiment of the invention.

Referring to FIG. 3 there is shown an exploded view of a number of membrane envelopes for transporting the blood together with intermediate heat exchange frame members. One diffusion membrane 2 and a dialysis membrane 3 are preferably sealed around their edges to form an envelope. Blood is supplied into the envelope by means of the entrance tubing 30 and exits from the envelope by means of the exit tubing 31.

The membrane envelopes 4, 5 and 6, 7 are similar to the membrane envelope 2, 3.

Figure 4:
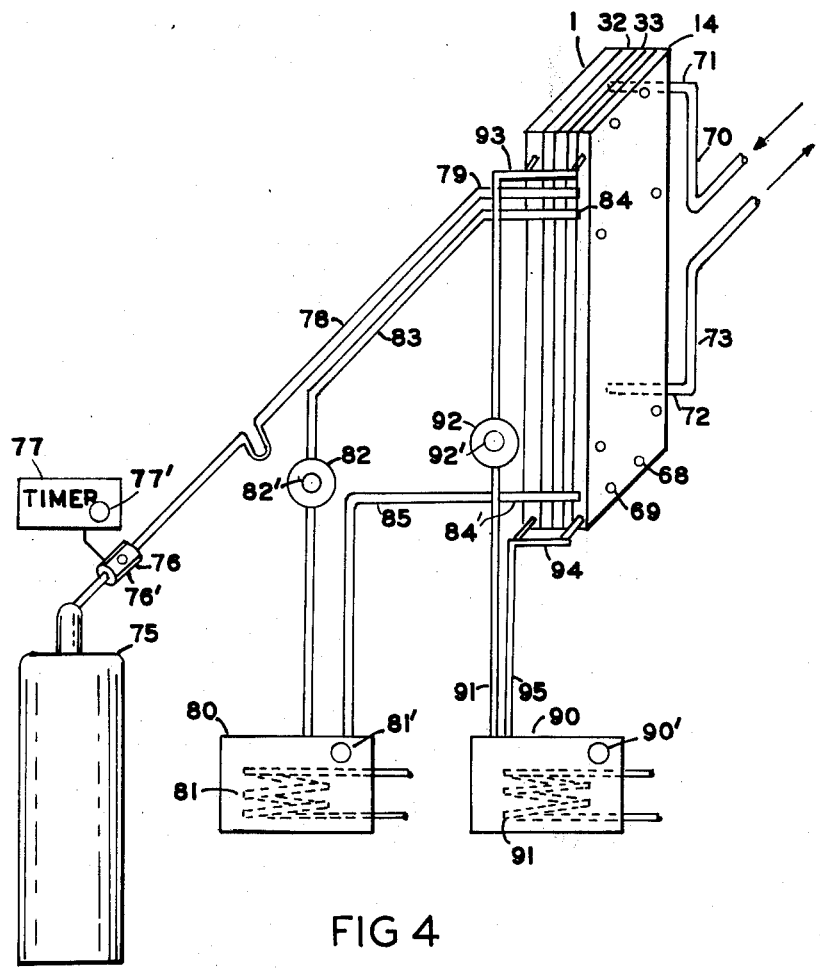
FIG. 4 is a perspective view illustrating the use of the embodiment of FIG. 3.

The membrane envelopes are clamped between frame members which consists of the end frame members 1 and 14 which are adapted for heat exchanging and the intermediate frame members 32 and 33 which are also adapted for heating exchanging. Any number of membrane envelopes may be added as required and the whole assembly is clamped together as illustrated in FIG. 4 either by conventional clamping members or by bolts passed through suitable mounting holes, not shown, in the frame members.

Figure 5A:
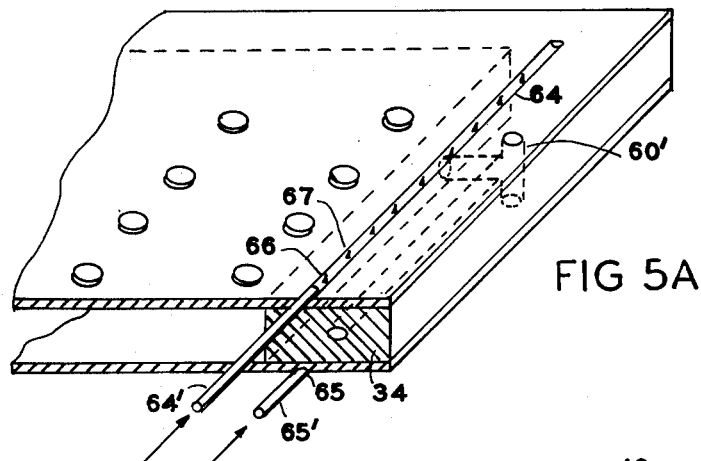
FIG. 5A is a detail sectional view of the embodiment of FIG. 3 taken along the line 5A—5A of FIG. 3.
Figure 5B:
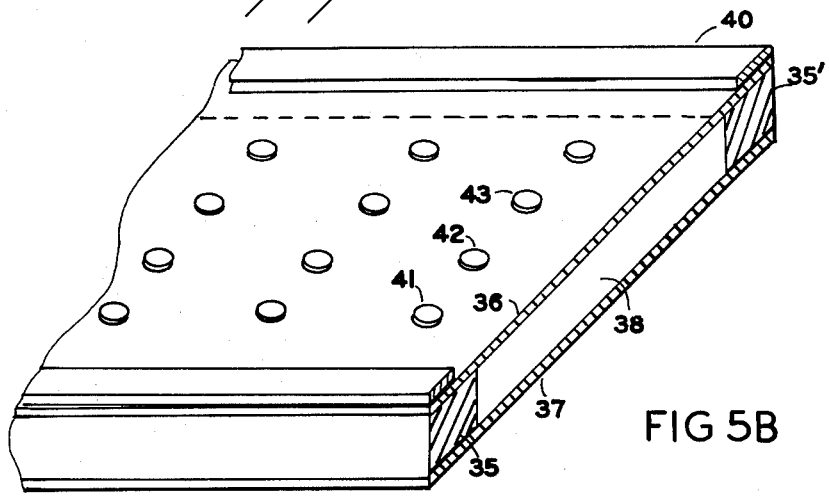
FIG. 5B is a detail sectional view taken along the line 5B—5B of FIG. 3.

In order to pass the oxygen and dialysis bath over the respective membranes input and output grooves are provided in the frame members, for instance referring to the frame members 32 and also referring to FIGS. 5A and 5B the frame member comprises a peripheral portion 34, 35, 35' upon which are mounted plates 36, 37 enclosing a hollow space 38. A gasket 40 is preferably mounted around the edge of the frame members to provide a good seal and also to provide sufficient spacing for the blood to flow through the membrane envelopes. The plates have a series of raised projections 41, 42, 43 for the purpose of spacing the membranes off the larger area of the plates so that the membranes may be easily removed.

In order to introduce the oxygen and dialysis bath, a series of grooves 44, 45, 46, 47 are provided in each of the frame members. These grooves are adapted to receive circular tubing which will pass the oxygen and dialysis bath so that it will flow between the grooved plate and the adjacent membrane, for instance the dialysis bath may be inserted in the grooves 44, 45 so that it will flow over the membranes 3 and 4 then exit from the grooves 46 and 47. The oxygen is likewise inserted into alternate members, for instance in grooves 50 and 51 of the frame member 33 so that it will flow over the adjacent membranes 5 and 6. Corresponding grooves are also provided in the end frame members.

The heat exchange is provided by connecting a source of suitably heated or cooled water to the input connections 53 in the end frame member 1 and 54 in the end frame member 14. These frame members have internal channels, for instance channel 55, 56 in the end frame member 14 which connect the heating or cooling flood into the internal spaces 57, 57' between the plates. The heating or cooling medium then exits from the hollow internal space by means of the internal shaft 58, 58' to the output connections 59, 59'. The cooling or heating flood is also adapted to flow through the intermediate frame members 32, 33 by means of connecting internal shafts 60, 60' in those members which connect with the input connections 53 and 54. The intermediate frame members also have internal spaces 38 with exit connections 61 and 62 which connect to the exit shafts 59, 59' in the end members.

FIGS. 5A and 5B show sectional detail views of the frame member 32 in FIG. 3. These figures show the hollow space 38 for the thermal control fluid and the gasket 40 for providing a seal around the membranes. There would be a corresponding gasket on each side of the membrane envelope. Raised projections 41, 42, 43 are provided on the surface of the plates 36, 37, etc. to space the membranes from the plate surfaces so as to facilitate the flow of the oxygen and dialysis fluid over the surface of the membranes.

The thermal control liquid flows through the internal channel 60' and the dialysis fluid or oxygen, as the case may be, is introduced into the grooves 64, 65 by means of suitable tubing 64', 65'. The grooves 64 etc. preferably have a plurality of projections 66, 67, etc. which tend to equally distribute the fluid or the oxygen over the surface of the membranes.

Figure 6:
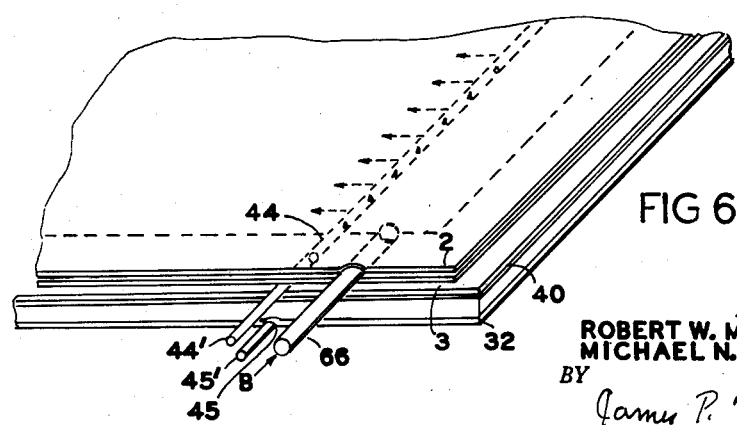
FIG. 6 is an enlarged detail view of the embodiment of FIG. 3.

Referring to FIG. 6 there is shown a detail view of a membrane envelope comprising the membranes 2 and 3. The blood B is introduced between the membranes by means of the tubing 66 and the oxygen or dialysis fluid is introduced in the grooves 44, 45, etc. by means of the tubing 44' and 45' in the frame member 32. As many membrane envelopes and frame members may be used as desired for the amount of blood flow required.

FIG. 4 shows a view of the assembled apparatus having a plurality of membranes sandwiched between the frame members 1 and 14. This may be done by conventional clamps or by bolts through the edge mounting holes 68, 69, etc.

The blood is supplied through tubing 70 and manifolds 71 to the input tubing 30, etc. of FIG. 3. The blood exits from the tubing 31, FIG. 3, in each membrane through the manifold 72 and tubing 73. The blood is pumped by conventional apparatus which is outside the scope of this invention.

Oxygen is supplied from the tank 75 through valve 76 having a flow adjustment knob 76′, which is preferably operated in pulsating manner by means of the timer 77 having adjustment knob 77′. The oxygen flows through the tubing 78 and manifold 79 to the respective oxygen input grooves in the upper portion of the frame members. The oxygen then flows over the membranes and exits through the grooves at the opposite ends of the frame members which exhaust to the atmosphere.

The dialysis fluid is supplied from tank 80 where it is adjustably thermally controlled in conventional manner by means of the coil 81. The dialysis fluid is pumped by means of pump 82 having adjustment knob 82′. The fluid then flows through the tubing 83 and manifold 84 to the respective input grooves in the upper ends of the frame members. The fluid then flows over the respective membranes and exits from the frame members through the exit grooves at the bottom of the frame members through the manifold 84′ through tubing 85 back to the tank 80 or optionally to some other tank if the fluid needs to be regenerated. The amount of oxygen and dialysis fluid may be controlled by controlling the valve 76 and the pump 82 respectively for the proper conditions in a given application.

The thermal control fluid is supplied from the tank 90 where it is adjustably thermally conditioned in conventional manner by means of the coil 91 connected to a suitable source of heating or cooling medium, as is the coil 81. The thermal fluid flows from the tank 90 through the tubing 91, pump 92 having flow adjustment means 92′ to the manifold 93 which is connected to the input connections 53, 54 in FIG. 3. The thermal fluid then flows through the hollow spaces in the frame members and exits from the exits 59, 59′, FIG. 3 through manifold 94 and tubing 95 back to tank 90.

Therefore the present invention provides a simplified simultaneous or sequential oxygenation and/or dialysis preferably with a predetermined pulsation of the blood which is provided by the pulsating oxygen pressure, under thermal control. By making proper connections the oxygenation or dialysis may be performed separately, for instance at different times.

One of the features of the invention is that it is quickly disassembled so that the membranes may be removed and disposed of after each use. The membranes are relatively inexpensive so it is practical to dispose of them rather than attempting to purify them for re-use. In this invention use has been made of ultrathin .00025″ cast polytetrafluoroethylene, as manufactured by Dilectrix Corp., Farmingdale, N.Y., as the oxygenation membrane.

The methods taught by the present invention may be performed with specifically different apparatus. For instance, the heat exchange means may be of different construction and the pulsating means may be operative directly on the blood flow rather than by means of oxygen pulsations.

Typical examples of the unique processing action gained in this arrangement are described as follows:

EXAMPLE 1

This example demonstrates the effectiveness of the oxygenator-dialysis unit in removing high levels of urea from blood which is physiologically significant in cases of kidney failure giving rise ultimately to uremic poisoning. The oxygenation-dialysis in this experiment consists of a three-member arrangement A, B, C as shown in FIG. 1 having approximate planar dimensions of 36 inch length by 14 inch width providing an effective film area, including edges for closure of approximately 375 square inches, using a 0.00025-inch cast film made of polytetrafluoroethylene as described in U.S. Patent 2,852,811, for the oxygenation, and a number 300 gauge cellophane film for the dialysis. Using the arrangement of pumping and introducing the blood as described in our before mentioned copending U.S. application, the films are arranged in such a manner that the blood is circulated between membranes 2 and 3, 4 and 5, 6 and 7, 8 and 9, 10 and 11, and finally 12 and 13, appropriately provided with inlets and manifolds as described herein and in our copending application. The blood layer is contained to an average thickness of approximately 0.010 inch by employing a pre-stretched film of cast polytetrafluoroethylene strained not in excess of 25% in the combined planar directions. The blood flow in this example is adjusted to 200 plus or minus 25 cubic centimeters per minute. This provides a thin blood layer at volumes averaging approximately 70 plus or minus 15 cubic centimeters per membrane.

The oxygenation is effected between the outer plate 1 and membrane 2, membranes 5 and 6, 9 and 10, and 13 and outer plate 14, again furnished with appropriate inlets and outlets connected to manifolds.

The dialysis is carried out between membranes 3 and 4, 7 and 8, and 11 and 12 using the aqueous dialysis solution listed in the following tabulation:

| Ingredients | Amounts |
| --- | --- |
| Sodium | 140 milliequivlaents/liters. |
| Potassium | 4.5 milliequivalents/liters. |
| Calcium | 4.5 milliequivalents/liters. |
| Magnesium | 1.0 milliequivalents/liters. |
| Chloride | 120 milliequivalents/liters. |
| Bicarbonate | 27 milliequivalents/liters. |
| Lactic Acid [1] | 9 ml. 85% Solution. |

[1] Sufficient to adjust pH to 7.4.

For the functions of this dialysis solution reference is made to article by Skeggs, L. T. and co-workers, published in proceedings of the Society of Experimental Biology and Medicine, volume 72, page 539 (1949). The dialysis solution is circulated through a reservoir 80 FIG. 4, provided with thermal control with a heat demand or cooling source so as to serve as a heat exchanger using flow rates in the range of 50 to 250 cubic centimeters per minute. The unit is primed with three pints of out-dated human whole blood, allowing reasonable volume for holdup in tubing and reservoir. A series of timed experiments for urea content in terms of basic urea nitrogen (BUN) are carried out following conventional clinical laboratory analyses. The combined oxygenation and dialysis is carried out with variations that include dialysis with and without simultaneous oxygenation. Typical results are shown in the following table based on out-dated whole blood admixed with urea to a level of 200 milligram percent and maintained at a temperature level of 38.5° C. by means of thermostat heat-exchanger 90 as described in our above mentioned copending application.

| Time (Hours) | Basic Urea Nitrogen content (BUN—Milligram Percent | |
| --- | --- | --- |
| | With Oxygenation | Without Oxygenation |
| 0 (start) | 200 | 200 |
| 2 | 130±8 | 150±8 |
| 4 | 100±6 | 125±8 |
| 6 | 78±6 | 105±12 |
| 8 | 60±8 | 82±6 |
| 12 | 36±6 | 58±8 |

These results indicate a more effective reduction or elimination of urea by the combination oxygenation and dialysis. This is believed to have a significant clinical implication in that to attain a level of 36±6 milligram percent of urea in the oxygenation series it would be necessary to prolong the dialysis from 12 to 16 hours or by a factor of 33% requiring additional professional surveillance. The mechanism for this accelerated elimination of urea is not known and may indeed be the result of many complex factors including possibly the balance of the flows of the various membrane components. With some out-dated blood samples this accelerated elimination was less pronounced but other beneficial effects, particularly less variable blood pH and less damage to the blood components especially hemoglobin, were evident. The accelerated urea reduction with oxygenation appears to be dependent upon simultaneous but unresolved chemical, physical-chemical, or physical factors. It has been suggested that with high oxygen tension in the circulating blood the transport or diffusion of urea is favored by electrostatic forces whereas with low oxygen tension and correspondingly high carbonate iron content in the blood there is a higher retention of urea by means of the urea-carbonate iron complex which by virtue of its molecular size would retard the transport or diffusion across the cellophane membrane. Regardless of the mechanism or mechanisms, this concomitant system of oxygenation and dialysis is somewhat unexpected and yet most valuable physiologically.

EXAMPLE 2

This example illustrates the effectiveness of the oxygenation-dialysis unit of this invention in removing glucose from blood which is physiologically significant in clinical cases of hyperglycemia associated wtih diabetic condition. The same arrangement of three members A', B', C', FIG. 1 using cast one quarter-mil thick film of polytetrafluoroethylene and 300 gauge cellophane for oxygenation and dialysis respectively were employed. In this case, outdated human whole blood was admixed wtih pure glucose to a level of 120 milligrams per 100 milliliters of blood. The same dialysis solution described in Example 1 was applied as were the identical throughput or flow rates for the circulating blood and the dialysis solution. From a series of twelve experiments the following data on reduction of glucose were observed.

| Time (hours) | Glucose Content, mgm./100 ml. Blood | |
|---|---|---|
| | With Oxygenation | Without Oxygenation |
| 0 (start) | 120 | 120 |
| 0.25 | 70.0±0.4 | 78.0±0.8 |
| 0.50 | 47.0±0.6 | 59.5±0.9 |
| 0.75 | 33.0±0.7 | 42.0±0.9 |
| 1.00 | 22.5±0.6 | 33.5±0.9 |
| 1.50 | 10.5±0.3 | 20.0±0.5 |
| 2.00 | 6.0±0.1 | 12.0±0.2 |

These results show a more effective elimination of glucose with simultaneous oxygenation and dialysis. As in the case of urea elimination, the glucose elimination described in this example is significant in a chemical sense for rapid removal in physiological distress. This implies that patient management can be decreased significantly because without oxygenation to attain the 6.0 mg. glucose level would take an estimated additional 1 hour or more.

The mechanism for the higher elimination rate with concurrent oxygenation is not known but is somewhat unexpected. It may be tied into some chemical, physical-chemical, or physical series of mechanisms that are not too well established. It may also be that the oxygen tends to decrease the binding of glucose to some undetermined blood component. In any case the utility of this combined system is significant.

EXAMPLE 3

This example illustrates the effectiveness of this invention in the dialysis of complex molecular structures notably drugs such as would be ingested into the blood stream with severe comatose effect. To illustrate this point, outdated human bank blood was admixed with the sedative glutethimide, known in proprietary terms as Doriden, having toxic effects similar to barbiturates when taken in severe overdose. The same blood throughput rate and dialysis solution flow rates were used as described in previous examples.

The following data summarize the average results of a series of tests carried out with and without oxygenation.

| Time (hours) | Glutethimide Content, mgm./ 100 ml. Blood | |
|---|---|---|
| | Without Oxygenation | With Oxygenation |
| 0 (start) | 10.0 | 10.0 |
| 2 | 8.0 | 4.4 |
| 4 | 6.0 | 1.80 |
| 6 | 3.0 | 0.90 |
| 8 | 1.60 | 0.44 |
| 10 | 0.85 | 0.22 |
| 12 | 0.50 | 0.10 |

The simultaneous oxygenation-dialysis system has shown a pronounced elimination rate compared to the rate with non-oxygenation. The results emphasize the surprisingly high rate beyond that observed with either urea or glucose elimination. The mechanism in this case is unknown and may be peculiar to the construction of this invention or possibly to mechanisms involving either chemical-physical or purely mechanical reasons by virtue of the pulsatile effect. It has been suggested that the high oxygen tension may be disrupting the protein bound Glutethimide which by virtue of its high molecular weight cannot be expected to diffuse as rapidly as the unbound form. The mechanism or kinetics of this supposed protein binding is not quite clear but may provide a clue to the above unexpected result. The nature of the binding may be additionally dependent upon the admixture technique or possibly on some undetermined characteristics of the stored whole blood used in this and in previous examples.

While the examples described in this application refer to blood circulated outside of an intact organism, they are not necessarily limited thereto. The combination oxygenation-dialysis system is equally applicable to extracorporeal correction of organic functions in living animals and clinically in humans. Apart from clinical applications, this combination system is especially valuable in reconstituting whole blood by removing selected components especially low molecular weight entities prior to any of the usual dehydration processes for producing plasma. Moreover the mechanical system of this invention as well as the process implied therein is applicable to carrying out dialysis of plasma rediluted to fluidized condition or extended with such materials as dextran, polyvinylpyrrolidone and the like for removing any specified low molecular weight by-products while at the same time adding or even removing oxygen as required during any process involving desired rectification of blood.

We claim:

The process of oxygenating and removing deleterious materials from the blood of a patient comprising the simultaneous steps of,
  passing a thin film of said blood between and in contact with closely spaced parallel ultra thin membranes, one of which is a hydrophobic diffusing membrane and the other an ultra thin hydrophilic dialysing membrane,
  said diffusing membrane being adapted to pass oxygen and said dialysing membrane having structure adapted to pass impurities from said blood,
  passing oxygen under pressure in a confined space on the other side of said diffusing membrane and in contact therewith,
  passing a dialysing bath in a confined space on the other side of said dialysing membrane in contact therewith, maintaining the temperature of the blood within a predetermined range, and
  pulsating said oxygen.

(References on following page)

References Cited by the Examiner
UNITED STATES PATENTS

| | | | |
|---|---|---|---|
| 2,652,831 | 9/53 | Chesler | 128—214 |
| 2,686,154 | 8/54 | MacNeill | 210—321 |
| 2,880,501 | 4/59 | Metz | 210—321 X |
| 3,034,505 | 5/62 | Sobol | 210—321 X |
| 3,060,934 | 10/62 | Claff et al. | 210—321 X |
| 3,074,401 | 1/63 | Friedman et al. | 261—153 X |

OTHER REFERENCES

Anthonisen et al.: "Clinical Experience with the Skeggs-Leonards Type of Artificial Kidney," The Lancet, vol. II, No. 25, Dec. 1956 (p. 1277).

REUBEN FRIEDMAN, *Primary Examiner.*

HERBERT L. MARTIN, *Examiner.*